May 15, 1934. O. U. ZERK 1,959,257
HINGE BEARING
Filed April 12, 1932
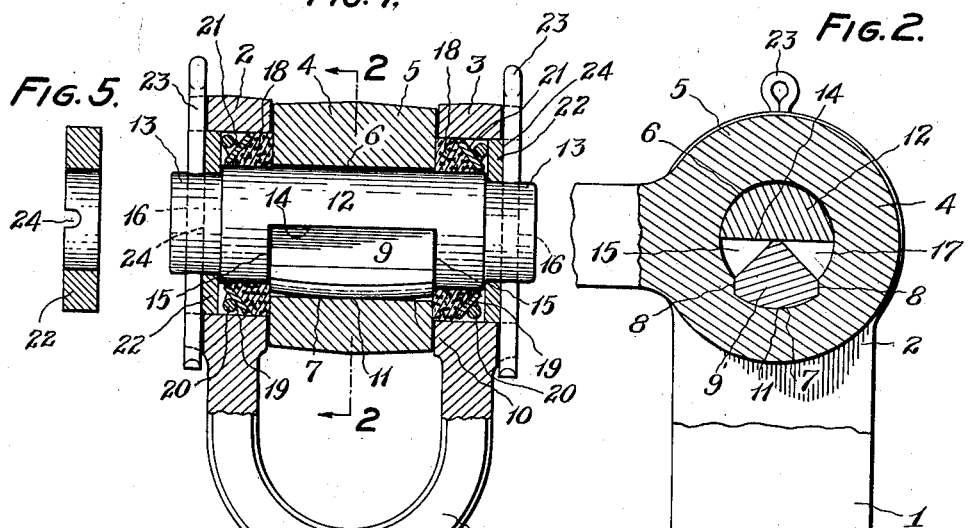
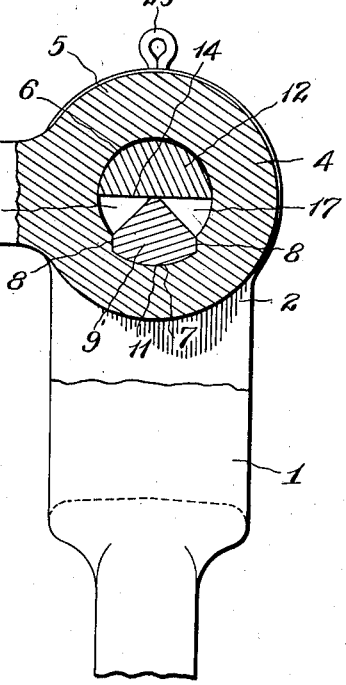
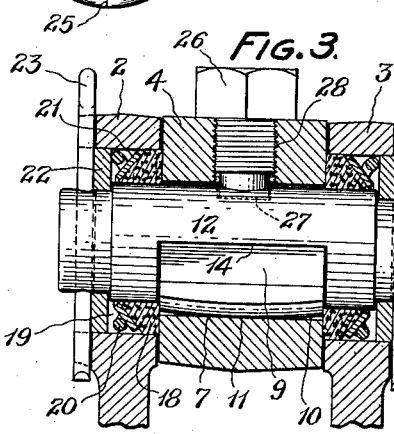
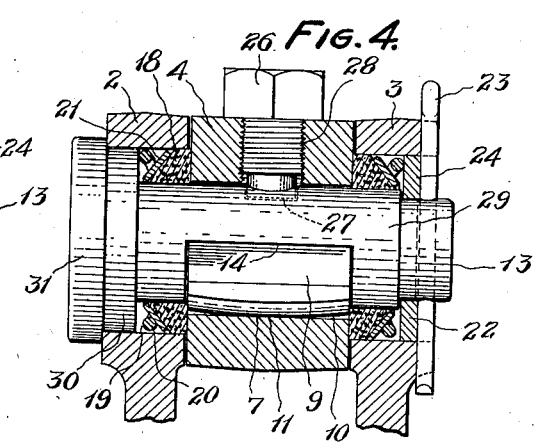
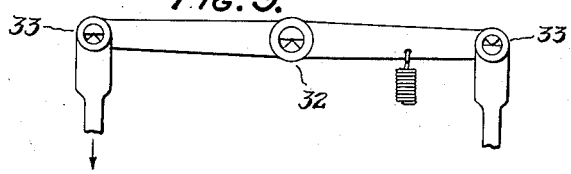
INVENTOR.
Oscar U. Zerk
BY
Slough & Canfield
ATTORNEYS Patented May 15, 1934

1,959,257

UNITED STATES PATENT OFFICE 1,959,257

HINGE BEARING

Oscar U. Zerk, Cleveland, Ohio

Application April 12, 1932, Serial No. 604,774

20 Claims. (Cl. 287—100)

My invention relates generally to hinges, clevises and the like devices in which two mechanical elements have a limited hinging or oscillating movement, and relates particularly to improved bearing mechanisms for uniting the said two mechanical elements in a relatively non-frictional manner.

A principal object of my present invention is to provide an improved oscillatory bearing for hinges, clevises and the like, wherein relative movement of the interconnecting or hinging parts may be accomplished without the introduction of objectionable friction between the relatively movable parts, even though little or no lubricant is applied to the bearing surfaces of said parts.

Another object of my invention is to provide an improved oscillatory bearing of the so-called knife edge type, which while in use may be effectively sealed against the ingress of dirt and grit to the bearing surfaces.

Another object of my invention is to provide an improved oscillatory bearing mechanism wherein objectionable lateral movements of the bearing parts are effectively prevented in a simple inexpensive manner.

Another object of my invention is to provide an improved bearing mechanism of the knife edge type adaptable for highly efficient non-frictional operation, wherein the various parts are effectively maintained in their proper relative positions in a very effective inexpensive manner.

Another object of my invention is to provide an improved bearing mechanism which is of especial application to hinges or clevises, and wherein a clevis pin or hinge bolt is employed forming an element of the bearing in combination with other bearing means disposed between the clevis jaws which makes a knife edge bearing contact with said bolt and wherein relative lateral movements of the parts are effectively prevented.

Another object of my invention is to provide an improved clevis bearing mechanism wherein each and various of the aforesaid objects are effectively achieved, and characterized by the provision of improved means to seal the bearing surfaces against the ingress of dirt and grit while in practical operation.

Another object of my invention is to provide a clevis adapted to relatively high pressures and high speed operations wherein the hinging or oscillating movement will be effected with a minimum amount of friction.

Another object of my invention is to provide an improved clevis exposed to relatively heavy pressures and high speed operations wherein a bearing of the knife edge type may be employed.

Another object of my invention is to provide for a hinge or clevis bearing exposed to relatively large pressures and high speed operations, improved self-sealing packing elements to maintain the bearing surfaces in proper non-frictional condition.

Another object of my invention is to provide a hinge bearing of the above type employing relatively inexpensive parts which may be easily and efficiently assembled.

Another object of my invention is to provide an improved clevis bearing mechanism having durable stainless steel bearing surfaces.

Another object of my invention is to provide an efficient bearing mechanism for clevis joints of the knife oscillatory type wherein the so-called knife edge element of the bearing is provided with an improved blunted rolling bearing edge making practically no sliding movement on any cooperating bearing surface.

Other objects of my invention and the invention itself will become more apparent to those skilled in the art to which my invention appertains by reference to the following description of certain embodiments of my invention which are illustrated in the accompanying drawing, wherein:

Fig. 1 is a fragmentary elevational view partially in section of a clevis embodying my invention in a preferred form;

Fig. 2 is a fragmentary side elevational view of the embodiment of my invention illustrated in Fig. 1, partly in section along the plane 2—2 of Fig. 1;

Figs. 3 and 4 are views similar to Fig. 1 illustrating modifications of my invention;

Fig. 5 is a sectional view of an end washer element which I may employ;

Fig. 6 is a top plan view of a single convolution, serpentine shaped spring used to exert pressure on a packing means which I may employ;

Fig. 7 is an elevational view of the spring illustrated in Fig. 6;

Fig. 8 is a view illustrating the shape of the spring wire from which the spring of Figs. 6 and 7 is made and before it is bent to its closed form;

Fig. 9 is a view of a lever embodying my invention wherein the fulcrum is disposed intermediate the lever ends and is preferably of knife edge bearing type, and the hinge or clevis connections are at each end of the lever and oppositely disposed.

Referring now to Figs. 1 and 2 of the drawing, I show at 1 a generally U-shaped clevis element provided with clevis jaws 2 and 3 and a clevis element 4 disposed intermediate the said jaws. As best illustrated in Fig. 2, the clevis element 4 comprises a head 5 having an axially aligned bore 6 which is circular for substantially three-fourths of the bore, the remainder of the bore comprising a concentric arcuate portion 7 and preferably parallel plane surfaces 8. A knife edge sector 9 provided with a longitudinally curved base as indicated at 10 is seated within the portions of the bore bounded by the surfaces 8 and the arcuate portion 7.

Normally the sector will seat at a central portion 11 only, but may seat at a plurality of points longitudinally thereof when the direction of thrust exerted by or upon the U-shaped clevis element 1 is inclined somewhat with the vertical. It will thus be observed that such a construction not only permits of a relative rocking motion longitudinally of the sector, but will tend to center the force exerted by or upon element 1 and thereby eliminate the fine machine work which would be required if no such adjustment were provided.

A hardened steel pin 12 comprising a generally cylindrical central portion and slightly reduced cylindrical ends 13 is cut away along a diameter for a distance slightly greater than the length of the sector thereby forming a semi-cylindrical cross-section and a rectilinear appearing longitudinal section, thus providing bearing surface 14 and end faces 15. The end portions 13 of pin 12 are provided with key apertures 16 preferably disposed at right angles to the plane of bearing surface 14. The knife edge sector 11 and the bearing pin 12 are preferably formed of stainless or rustless steel, containing chromium and suitably hardened. The knife edge of sector 11 is preferably slightly rounded since a sharp knife edge would be more subject to wear.

In assembling the clevis the knife edge sector 9 is disposed intermediate the faces 15 of pin 12, and the pin end sector is then centrally positioned in the bore provided therefor in the head 5 of element 4, the element 4 having previously been suitably positioned intermediate the clevis jaws 2 and 3 of the U-shaped clevis element. The sector 9 will then be in movable relation with its seating surface in the head 5 formed by arcuate portion 7 and plane surfaces 8. The pin 12, which is of substantially the same diameter as the bore provided in the head 5, will then have bearing surface 15 disposed horizontally and axially of head 5. It will be observed that sector-shaped chambers 17 are thereby formed between the bearing surface 14 of pin 12 and the diverging faces of sector 9. Frusto-conical shaped packing washers 18 formed of felt or other suitable material are placed over the pin 12 and within an aperture 19 provided within jaws 2 and 3 and concentric with pin 12.

The washers 18 then abut the side faces of head 5, the inner walls of apertures 19 and the cylindrical surface of pin 12, and are wedgingly secured thereagainst by a compressed spring 20 which presses against a frusto-conical shaped, preferably sheet metal washer 21 in engagement with the outer faces of packing washer 18. Outwardly the spring 20 seats against an annular washer 22, shown in cross-section in Fig. 5 which is slidingly disposed over the end 13 of pin 12 and into the aperture 19, and is non-rotatably secured therewith and within aperture 19 by a key 23, which is engaged by the diametrically positioned slots 24 in said washer.

The jaws 2 and 3 are provided with aligned preferably vertical diametrically disposed slots in the outer faces thereof adapted to engage the key 23 whereby the washer 22 and the pin 12, which has the key 23 passing through aperture 16, provided therein, will be supported coaxially of the apertures 19 and locked in non-rotative relation with the U-shaped clevis element 1. Thus, also, the bearing elements are effectively sealed against the entry of grit or other foreign substances which might cause an abrasive action between the bearing surfaces.

In Figs. 6, 7 and 8, I show the spring 20. It is a single, generally circular, loop, serpentine-shaped spring formed from a length of wire secured together at the ends thereof preferably by butt welding as indicated at 25.

Fig. 8 illustrates the length of the spring wire and the undulated shape thereof before it is bent to circular form and the ends secured. It will be noted by employing this type of spring that only a relatively small space along the spring axis is necessary to accommodate it and yet it may exert a relatively large compressive resilient force. Further, such a spring gives a more even distribution of pressure about the packing washer inasmuch as it exerts pressure thereon at three substantially equally spaced points and engages the abutting washers 22 at three intermediately spaced points.

The construction described which employs a hardened bearing surface and a hardened knife edge sector ensures a minimum of friction. When the pin and the knife edge sector are rocking axially of each other, there is no friction therebetween, and when this knife edge is slightly rounded, the very slight lateral movement due to the rocking or oscillating movement therebetween will create relatively little friction.

Although I have shown the bearing surfaces as generally being formed in the shackle pin and the knife edge element being disposed in the bushing, I contemplate that this may be reversed and the bearing surface formed substantially axially in a bushing and the knife edge element being formed integral with or embraced by the shackle pin. I further contemplate that the bushing which houses the relatively movable sector or knife edge element may be flared outwardly longitudinally rather than formed cylindrically as shown, to permit of a relative longitudinal rocking thereon while maintaining the contacting surface of the knife element straight.

In Fig. 3 I have shown a modification of my invention which is generally similar to the modification shown in Figs. 1 and 2, but wherein I employ a bolt 26 provided with a faced shank 27 at one end thereof which bolt-threadedly engages an aperture 28 provided therefor in clevis element 4, and the shank 27 engages the side walls of an arcuate recess provided therefor in pin 12 whereby the element 4 and the pin 12 are limited in relative longitudinal movement and the clevis element 4 is prevented from frictionally engaging the clevis jaws 2 and 3. It is to be noted that in this construction, sufficient clearance is provided between shank 27 and the recess walls provided therefor in pin 12 to accommodate the lateral movement required as the pin is rocked relatively to the element 4. Furthermore, the shank and recess engagement is disposed at a point where it is sealedly enclosed by the packings 18—18.

I have shown in Fig. 4 another modification of my invention which is similar to Fig. 4 but wherein I employ a clevis pin 29 provided with successively enlarged heads 30 and 31, the head 30 being substantially the same diameter as aperture 19 of jaw 2, and the enlarged head 31 abutting the outer face of the said jaw, thereby preventing longitudinal movement in one direction of the pin relative to the U-shaped clevis element 1. In this construction the use of one of the washers 22 is omitted since the inner face of head 30 serves as a base against which spring 20 presses.

In Fig. 9 I have illustrated my invention applied to a lever of the type wherein the fulcrum is placed intermediate the applied and resultant forces at the lever ends. I preferably employ a knife edge bearing at the fulcrum point indicated at 32, and clevises such as described above indicated at 33—33. It will be observed that I have shown the knife edge as generally opposing the direction of the applied force thus preferably ensuring that there will always be bearing engagement between the knife edge and the planular bearing surface.

In levers of this type which may transmit relatively heavy loads and employ a high operating speed such a bearing may be very advantageously used and, due to the relatively small frictional forces, need not be lubricated during the entire life of the machine upon which they are employed, although the chambers (15 and 17, Fig. 2) could be utilized to hold lubricant if desired. Such constructions employing my invention have the advantage previously pointed out of permitting a lateral movement of the clevis members in addition to movement in the plane of the lever, or a universal movement which also effects a self-alignment of the bearing.

Although I have shown and described embodiments of my invention, I contemplate other embodiments, which will be understood by those skilled in the art, without departing from the spirit and scope of my invention and the appended claims.

Having thus described my invention, what I claim is:

1. A hinge construction comprising a bifurcated and an intermediate member, a pin having cylindrical portions at both ends and, intermediately of the cylindrical portions, being semi-cylindrical, projected through a perforation in the intermediate member and enlarged aligned perforations in the bifurcated member and a knife edge bearing element in the perforation of the intermediate member engaging the diametral surface of the pin, and sealing rings in the enlarged perforations and means disposed axially outwardly of the sealing rings engaging the bifurcated member and the pin preventing relative rotation therebetween.

2. A hinge construction comprising a bifurcated and an intermediate member, a pin having cylindrical portions at both ends and, intermediately of the cylindrical portions, being semi-cylindrical, projected through a perforation in the intermediate member and enlarged aligned perforations in the bifurcated member, a knife edge bearing element in the perforation of the intermediate member engaging the diametral surface of the pin, and means engaging the bifurcated member and the pin preventing relative rotation therebetween, and sealing rings in the enlarged perforations surrounding and sealing the cylindrical end portions of the pin and engaging and sealing opposite portions of the intermediate member adjacent the perforation thereof.

3. A hinge construction comprising a bifurcated and an intermediate member, a pin intermediately semi-cylindrical, projected through a perforation in the intermediate member and enlarged aligned perforations in the bifurcated member, a knife edge bearing element in the perforation of the intermediate member engaging the diametral surface of the pin, means engaging the bifurcated member and the pin and preventing relative rotation therebetween, and a washer on the end of the pin peripherally engaging the wall of the bifurcated member perforation to dispose the pin coaxially in the perforation and to prevent radial movement of the pin in the perforation.

4. A hinge construction comprising a bifurcated and an intermediate member, a pin cylindrical at both ends and intermediately semi-cylindrical, projected through aligned perforations in the two members, a knife edge bearing element in the perforation of the intermediate member engaging the diametral surface of the pin, means engaging the bifurcated member and the pin preventing relative rotation therebetween, a washer on the cylindrical end of the pin peripherally engaging the wall of the bifurcated member perforation, and means connecting the pin end and washer to prevent relative rotation thereof.

5. A hinge construction comprising a bifurcated and an intermediate member, a pin cylindrical at both ends and intermediately semi-cylindrical, projected through aligned perforations in the two members, a knife edge bearing element in the perforation of the intermediate member engaging the diametral surface of the pin, means engaging the bifurcated member and the pin preventing relative rotation therebetween, a washer on the cylindrical end of the pin peripherally engaging the wall of the bifurcated member perforation, and means engaging the pin end washer and bifurcated member to prevent relative rotation of the pin and the member.

6. A hinge construction comprising a bifurcated and an intermediate member, a pin cylindrical at both ends and intermediately semi-cylindrical, projected through aligned perforations in the two members, a knife edge bearing element in the perforation of the intermediate member engaging the diametral surface of the pin, means engaging the bifurcated member and the pin preventing relative rotation therebetween, a washer on the cylindrical end of the pin peripherally engaging the wall of the bifurcated member perforation, and a sealing ring surrounding the cylindrical pin end, engaging the intermediate member, and a spring reacting between the sealing ring and the washer.

7. A hinge construction comprising a bifurcated and an intermediate member, a pin cylindrical at both ends and intermediately semi-cylindrical, projected through aligned perforations in the two members, a knife edge bearing element in the perforation of the intermediate member engaging the diametral surface of the pin, means engaging the bifurcated member and the pin preventing relative rotation therebetween, a washer on an end portion of the pin peripherally engaging the wall of the bifurcated member perforation, and means connecting the pin end and washer to prevent relative rotation thereof.

8. A hinge construction comprising a bifurcated and an intermediate member, a pin cylindrical at both ends and intermediately semi-cylindrical, projected through aligned perforations in the two members, a knife edge bearing element in the perforation of the intermediate member engaging the diametral surface of the pin, means engaging the bifurcated member and the pin preventing relative rotation therebetween, a washer on an end portion of the pin peripherally engaging the wall of the bifurcated member perforation, and means engaging the pin end washer and bifurcated member to prevent relative rotation of the pin and the member.

9. A hinge construction comprising a bifurcated and an intermediate member, a pin cylindrical at both ends and intermediately semi-cylindrical, projected through aligned perforations in the two members, a knife edge bearing element in the perforation of the intermediate member engaging the diametral surface of the pin, means engaging the bifurcated member and the pin preventing relative rotation therebetween, a washer on an end portion of the pin peripherally engaging the wall of the bifurcated member perforation, and a sealing ring surrounding the cylindrical pin end, engaging the intermediate member, and a spring reacting between the sealing ring and the washer.

10. A hinge construction substantially as described in claim 1, and in which the intermediate member is adapted to rock relatively longitudinally of the pin whereby a limited universal movement of the members is effected.

11. A clevis comprising a forked clevis member, a cylindrical ended pin secured to the said forks and adapted to form one of a pair of cooperating bearing elements, an intermediate member encircling the pin intermediate the forks and adapted to form a second bearing element, one of the said elements being provided with a bearing surface disposed substantially at the pin axis and the other element being provided with a knife edge adapted to rockingly engage the said bearing surface, means to effectively seal the said bearing elements upon cylindrical end portions of the pin and means to limit relative longitudinal movement of the said bearing elements comprising an element secured to the intermediate member and engaging a recess provided therefor in the pin.

12. A clevis comprising a forked clevis element, a pin non-rotatably secured to the said forks and provided with a recess intermediate the forks formed by cutting away a portion of the pin substantially along a diameter thereof to provide a bearing surface, an intermediate clevis element encircling said pin intermediate the forks, a knife edge sector disposed intermediate the said pin bearing surface and an encircling portion of the intermediate clevis element, and adapted to rock longitudinally on the said intermediate element and upon the pin, bearing surface and means for effectively sealing the bearing surface comprising an annular recess formed by a portion of the pin externally of the intermediate clevis element and by a portion of the intermediate clevis element and by a portion of a fork, and annular packing means in the recess.

13. A clevis comprising a forked clevis element provided with aligned transverse apertures in the forks thereof, washers disposed within said apertures, a pin concentrically mounted in said apertures by the washers, said pin being provided with a bearing surface by cutting away a portion thereof substantially along a diameter, a second clevis element encircling the said pin intermediate the forks and provided with a longitudinally extending recess, a knife edged sector rockingly seated in said recess and adapted to engage the said pin bearing surface substantially axially thereof, packing means encircling the pin and abutting the faces of the second clevis element, spring means wedgingly engaging the said packing elements.

14. A clevis comprising a forked clevis element, a pin non-rotatably secured to the said forks and provided with a recess intermediate the forks formed by cutting away a portion of the pin substantially along a diameter thereof to provide a bearing surface, a second clevis element encircling the said pin intermediate the forks, a knife edge sector disposed intermediate the said pin bearing surface and the second clevis element adapted to rock longitudinally of the said element and radially of the pin, and means for effectively sealing the bearing surface against the ingress of foreign substances comprising a packing element disposed over the pin and abutting the second clevis element faces, a spring compressibly engaging the said packing element, a washer encircling the pin end, a key disposed within an aperture provided therefor at the pin end and engaging diametrically disposed recesses provided therefor in the washer and the forked clevis element thereby maintaining the forked clevis element, the washer, and the pin in relative non-rotational and lateral relation.

15. A clevis comprising a forked clevis element provided with aligned transverse apertures, an apertured second clevis element disposed intermediate the forked element with the aperture therein concentric with the apertures provided in the said forks, said second element being provided with a longitudinally extending recess, a pin disposed within the aperture of the said second clevis element and provided with a bearing portion formed by cutting away a section of the pin substantially axially thereof, a knife edge sector engaging the said pin bearing surface substantially axially thereof along the knife edge, and rockingly seated in said second element recess, a packing element encircling the said pin and abutting the faces of the second clevis element, a normally compressed spring engaging said packing element, a washer adapted to engage the said spring and encircle the pin ends to concentrically maintain the same relative to the second clevis element, the said pin, washer, and forked clevis element being maintained in relative non-rotative and non-lateral relation.

16. A clevis comprising a forked clevis element, a pin non-rotatably secured to the said forks provided with a recess intermediate the forks formed by cutting away a portion of the pin substantially along a diameter thereof to provide a bearing surface, an intermediate clevis element encircling the said pin intermediate the forks, a knife edge sector disposed intermediate the said pin bearing surface and an encircling portion of the intermediate clevis element adapted to rock longitudinally on the said intermediate element and upon the pin, bearing surface means for effectively sealing the bearing surface against the ingress of foreign substance, and means for restraining relative longitudinal movement of the pin and the intermediate clevis element comprising removable interengaging elements.

17. A clevis comprising a forked clevis element, a pin non-rotatably secured to the said forks provided with a recess intermediate the forks formed by cutting away a portion of the pin substantially along a diameter thereof to provide a bearing surface, an intermediate clevis element encircling the said pin intermediate the forks, a knife edge sector disposed intermediate the said pin bearing surface and an encircling portion of the intermediate element, the intermediate element adapted to rock longitudinally of the said sector and circumferentially of the pin, the said forked clevis element being provided with aligned apertures, the pin being provided at one end thereof with successively enlarged shoulders and at the other end with a reduced portion, said pin being concentrically disposed within the forked element apertures with one of the said shoulders abutting the outer face of the forked element and the other substantially engaging the inner wall of the forked element aperture, a spring compressively abutting the said second shoulder, a packing element wedgingly secured against the face of the intermediate clevis element and encircling the said pin, a second packing element engaging the opposite face of the said intermediate clevis element and wedgingly secured thereagainst, a washer encircling said reduced end portion and substantially engaging the periphery of the forked clevis element aperture, a key engaging aligned recesses in an element fork and the washer and being disposed within an aperture therefor in the pin end whereby the forked clevis element, the pin, and the supporting washers will be maintained in non-laterally movable and non-rotative relation.

18. A hinge construction comprising a bifurcated and an intermediate member, a pin having cylindrical portions at opposite ends and an intermediate portion being formed semi-cylindrical and projected through aligned perforations in the two members, a knife edge bearing element in the perforation of the intermediate member engaging the diametral surface of the pin, the perforations in the bifurcated member being larger than the pin cylindrical end portions, annular packing means sealing the cylindrical pin end portions and adjacent annular portions of the intermediate member and the peripheral portions of the perforations in the bifurcated member, a washer surrounding a pin end and closing at its periphery the perforation in the corresponding bifurcated member, means securing the washer against axial displacement from the pin, and resilient means reacting upon the washer and upon the packing means to effect resilient sealing thereby.

19. A hinge construction comprising a bifurcated and an intermediate member, a pin having cylindrical portions at opposite ends and an intermediate portion being formed semi-cylindrical and projected through aligned perforations in the two members, a knife edge bearing element in the perforation of the intermediate member engaging the diametral surface of the pin, the perforations in the bifurcated member being larger than the pin cylindrical end portions, annular packing means sealing the cylindrical pin end portions and adjacent annular portions of the intermediate member and the peripheral portions of the perforations in the bifurcated member, a washer surrounding an end portion of the pin axially outwardly of the annular sealing means, and means associated with the pin end and with the bifurcated member preventing axial displacement of the washer and preventing relative rotary movement of the pin and bifurcated member.

20. In a hinge construction, a bifurcated member and an intermediate member, a bearing pin element projected through aligned perforations in the two members, the perforations in the bifurcated member being of enlarged diameter, an annular packing means surrounding the pin externally of the intermediate member and sealing the pin, annular adjacent portions of the intermediate member and the inner periphery of the perforations in the bifurcated member, a washer on the pin end externally of the annular packing means, resilient means reacting upon the washer and the packing means to effect resilient sealing, the resilient means comprising an annular loop having axially offset corrugations.

OSCAR U. ZERK.